United States Patent
Shiiba et al.

(10) Patent No.: US 6,834,224 B2
(45) Date of Patent: Dec. 21, 2004

(54) VEHICULAR SHIFT CONTROL UNIT AND VEHICULAR AUTOMATIC SHIFT CONTROL METHOD

(75) Inventors: Kazuyuki Shiiba, Susono (JP); Tomokazu Inagawa, Toyota (JP); Yoji Takanami, Anjo (JP); Yoshikazu Tanaka, Toyota (JP); Hideo Tomomatsu, Nagoya (JP); Yoshio Ito, Susono (JP); Teru Konishi, Okazaki (JP); Masao Kawai, Chiryu (JP)

(73) Assignees: Toyota Jidosha Kabushiki Kaisha, Toyota (JP); Aisin Aw Co., Ltd., Anjo (JP)

(*) Notice: Subject to any disclaimer, the term of this patent is extended or adjusted under 35 U.S.C. 154(b) by 225 days.

(21) Appl. No.: 09/973,770

(22) Filed: Oct. 11, 2001

(65) Prior Publication Data

US 2002/0042672 A1 Apr. 11, 2002

(30) Foreign Application Priority Data

Oct. 11, 2000 (JP) .......................... 2000-311244

(51) Int. Cl.⁷ .............................................. G06F 17/00
(52) U.S. Cl. ........................ 701/65; 477/34; 701/200; 73/178 R
(58) Field of Search ................ 701/65, 56, 55, 701/200, 210; 477/34, 78, 97; 73/178 R (56) References Cited

U.S. PATENT DOCUMENTS

| | | | |
|---|---|---|---|
| 5,648,905 A | * 7/1997 | Izumi et al. | 180/169 |
| 5,832,400 A | * 11/1998 | Takahashi et al. | 701/53 |
| 5,890,087 A | 3/1999 | Ryoo | |
| 5,925,087 A | * 7/1999 | Ohnishi et al. | 701/1 |
| 5,959,572 A | * 9/1999 | Higashimata et al. | 340/903 |
| 6,070,118 A | * 5/2000 | Ohta et al. | 477/97 |
| 6,098,005 A | * 8/2000 | Tsukamoto et al. | 477/97 |
| 6,174,262 B1 | * 1/2001 | Ohta et al. | 477/120 |
| 6,182,000 B1 | * 1/2001 | Ohta et al. | 180/170 |
| 6,188,950 B1 | * 2/2001 | Tsutsumi et al. | 180/170 |
| 6,199,001 B1 | * 3/2001 | Ohta et al. | 701/208 |
| 6,278,928 B1 | * 8/2001 | Aruga et al. | 701/65 |

FOREIGN PATENT DOCUMENTS

| | | | |
|---|---|---|---|
| JP | 2000-46170 | * | 2/2000 |
| JP | 2000-65202 | * | 3/2000 |
| JP | 2000-142180 | * | 5/2000 |

* cited by examiner

*Primary Examiner*—William A. Cuchlinski, Jr.
*Assistant Examiner*—Olga Hernandez
(74) *Attorney, Agent, or Firm*—Oblon, Spivak, McClelland, Maier & Neustadt, P.C.

(57) ABSTRACT

A vehicular automatic shift control unit for executing a cooperative shift control (an upshift inhibition and a downshift) of an automatic transmission based on an information associated with a road condition around a vehicle or a road condition in front of the vehicle, is provided with judging means for judging whether a vehicle exists in a predetermined area including a branch point of the road during execution of the cooperative shift control, and gear ratio maintaining control means for maintaining a gear ratio of the automatic transmission if it is judged that the vehicle exists in the predetermined area.

18 Claims, 7 Drawing Sheets

| | C0 | C1 | C2 | B0 | B1 | B2 | B3 | B4 | F0 | F1 | F2 |
|---|---|---|---|---|---|---|---|---|---|---|---|
| N | | ○ | | | | | | | | | |
| Rev | ○ | | ○ | ○ | | | | ○ | | | |
| 1st | ○ | ○ | | | | | | ● | | | ○ |
| 2nd | ● | ○ | | | | | ○ | | ○ | | |
| 3nd | ○ | ○ | | | ● | ○ | | | ○ | | |
| 4th | ○ | ○ | ○ | | | △ | | | ○ | ○ | |
| 5th | | ○ | ○ | ○ | | △ | | | | | |

VEHICULAR SHIFT CONTROL UNIT AND VEHICULAR AUTOMATIC SHIFT CONTROL METHOD

INCORPORATION BY REFERENCE

The disclosure of Japanese Patent Application No. 2000-311244 filed on Oct. 11, 2000, including the specification, drawings and abstract is incorporated herein by reference in its entirety.

BACKGROUND OF THE INVENTION

1. Field of Invention

The invention relates to a vehicular shift control unit and vehicular automatic shift control method which controls a cooperative shift of an automatic transmission based on an information associated with a condition around a vehicle or a condition in front of the vehicle.

2. Description of Related Art

There has been well known a normal automatic shift control for controlling a gear stage of an automatic transmission so as to satisfy a gear stage determined based on a vehicle speed and an accelerator opening degree in accordance with a shift diagram. Further, there has been known a vehicular shift control unit for executing a cooperative shift control for controlling the automatic transmission to a different gear stage from the gear stage executed in accordance with the automatic shift control based on the information indicating the condition around the vehicle or in front of the vehicle, in addition to the automatic shift control. The information indicating the condition around the vehicle or in front of the vehicle is obtained by a navigation apparatus, a transmitting apparatus or the like provided in a road. According to this cooperative shift control, a gear ratio or a gear stage is controlled so as to obtain a driving force suitable for a road shape around the vehicle or in front of the vehicle. The vehicular shift control unit is, for example, constituted by a cooperative shift control unit described in Japanese Patent Application Laid-open No. 2000-142180. According to this structure, a radius of curvature of a curve is sequentially calculated so that an engine brake force capable of obtaining an optimum vehicle speed corresponding to a traveling direction of the vehicle, that is, the curve of the road ahead can be obtained, so as to determine a recommended gear ratio corresponding to the radius of curvature R. Accordingly, the vehicle can safely travels on a curved road. Further, the cooperative shift control unit calculates a speed reduction curve based on the recommended gear ratio, and compares an actual vehicle speed with the speed reduction curve. Next, the cooperative shift apparatus determines an upshift inhibition or a downshift based on the comparison, and executes the determined shift of the automatic transmission after releasing an accelerator pedal or operating a brake before entering a curve area.

In the vehicular shift control unit as mentioned above, the traveling path of the vehicle, that is, a destination road is definite during a period in which the traveling route in front of the vehicle is guided using the information from the navigation system. Accordingly, the gear ratio corresponding to the road curve can be obtained. However, since the destination path of the vehicle is not definite when the vehicle is not under route guidance, it is impossible to determine which branch road the vehicle should take when the vehicle approaches a branch point of the road. Accordingly, it is impossible to obtain road information data of the branch point transmitted from the navigation system and there is a possibility that the cooperative shift control is cancelled in the middle thereof. Therefore, a low speed gear stage is not continuously maintained in accordance with the cooperative shift control during traveling on the curved road, and there is a possibility that an upshift to a high speed stage is accidentally executed.

SUMMARY OF THE INVENTION

An object of the invention is to provide a vehicular shift control unit and a method for controlling the same in which a shift state executed by a cooperative shift control is continuously maintained during traveling on a curved road even when not being guided along a path.

In accordance with a first aspect of the invention, there is provided a vehicular automatic shift control unit that executes a cooperative shift control of an automatic transmission based on an information associated with at least one of a road condition around a vehicle and a road condition in front of the vehicle, including a judging apparatus that judges whether the vehicle exists in a predetermined area including a branch point of the road during execution of the cooperative shift control; and a gear ratio maintaining controller that maintains a gear ratio of the automatic transmission if it is judged that the vehicle exists in the predetermined area.

In accordance with the first aspect, the current gear ratio of the automatic transmission is maintained during a period that a vehicle travels within the predetermined area including the branch point. Accordingly, the vehicle can travel near the branch point in a state of maintaining the gear ratio of the automatic transmission applied during the cooperative shift control. Therefore, the shift state applied by the cooperative shift control during traveling on the curved road is continuously maintained. Accordingly, a drivability during traveling along a corner is not deteriorated.

In accordance with a second aspect of the invention, there is provided a vehicular automatic shift control method for executing a cooperative shift control of an automatic transmission based on an information associated with at least one of a road condition around a vehicle and a road condition in front of the vehicle, including a step of judging whether the vehicle exists in a predetermined area including a branch point during execution of the cooperative shift control; and a step of maintaining a gear ratio of the automatic transmission if it is judged that the vehicle exists in the predetermined area.

In accordance with the second aspect, in the same manner as the first aspect, the vehicle can travel near the branch point in a state of maintaining the gear ratio of the automatic transmission applied during the cooperative shift control. Accordingly, a drivability during traveling along a corner is not deteriorated.

DETAILED DESCRIPTION OF THE PREFERRED EMBODIMENTS

A detailed description will be given below of an embodiment of the invention with reference to the accompanying drawings.

Figure 1:
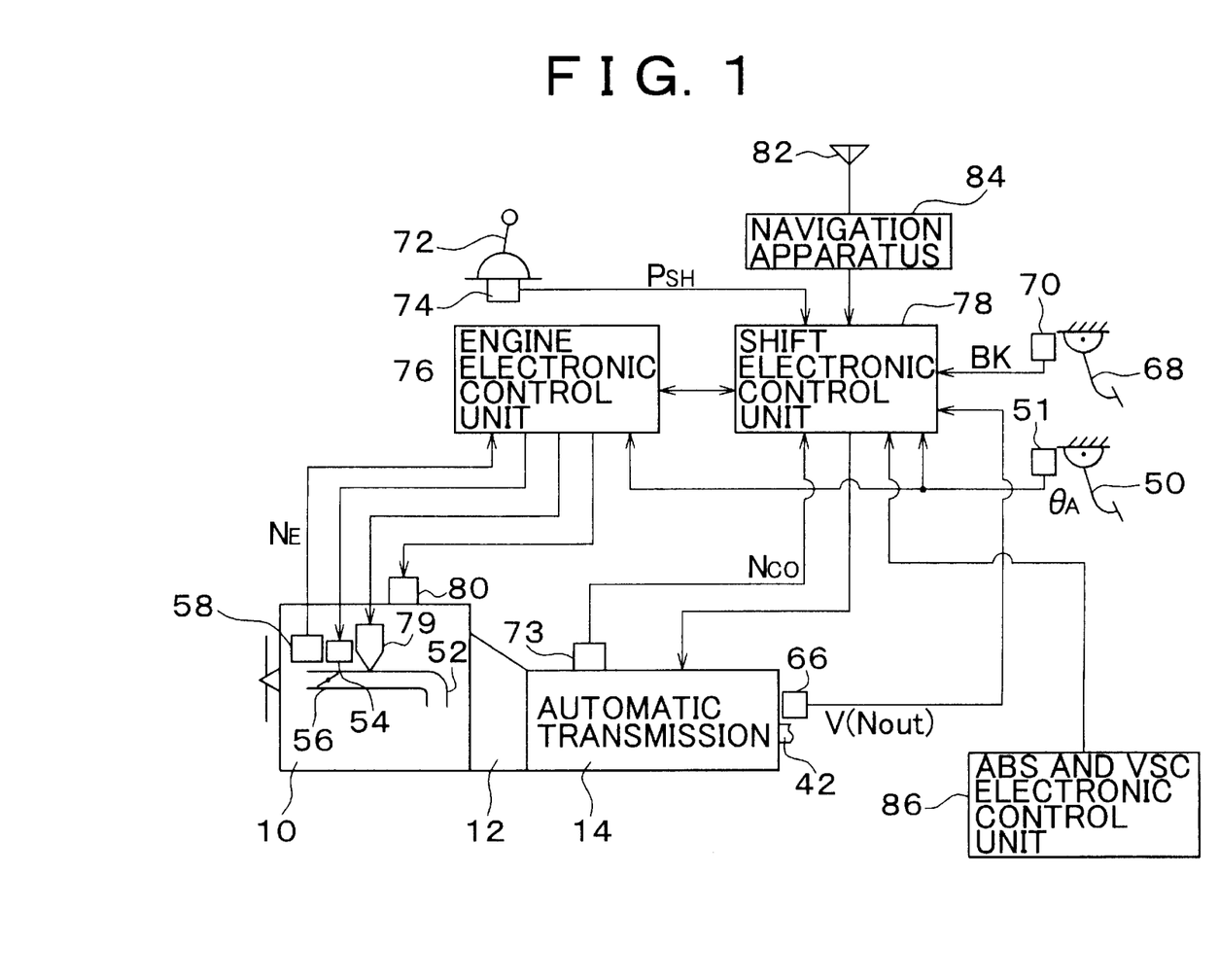
FIG. 1 is a block diagram describing a vehicular control unit including a shift control unit in accordance with an embodiment of the invention.
Figure 2:
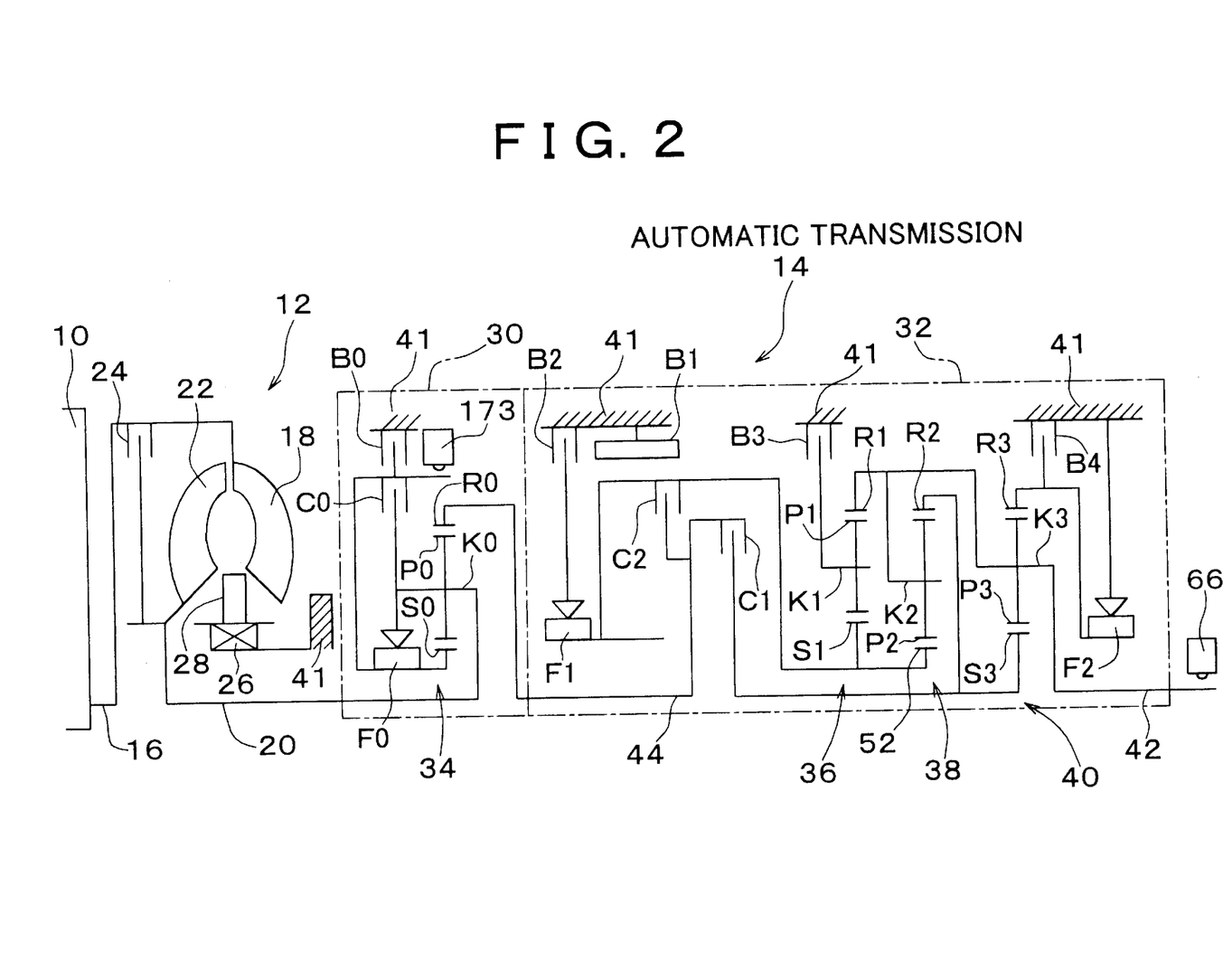
FIG. 2 is a schematic view describing a structure of an automatic transmission shown in FIG. 1.

FIG. 1 is a view briefly describing a structure of a power transmission apparatus and a control unit thereof in a vehicle to which a vehicular shift control unit of the invention is applied. In FIG. 1, a prime mover 10 is constituted by an internal combustion engine (an engine) and an electric motor or a combination thereof, or the like, however, in the following description, will be described as an engine. An output of the prime mover 10 is inputted to an automatic transmission 14 via a torque converter 12, and is transmitted to drive wheels via a differential gear apparatus (not shown) and an axle. FIG. 2 is a schematic view showing a structure of the torque converter 12 and the automatic transmission 14.

In FIG. 2, the torque converter 12 is provided with a pump impeller 18 connected to a crank shaft 16 of the engine 10, a turbine wheel 22 connected to an input shaft 20 of the automatic transmission 14, a direct clutch, that is, a lockup clutch 24 for connecting the pump impeller 18 and the turbine wheel 22, and a stator 28 in which rotation in one direction is prevented by a one way clutch 26.

In FIG. 2, the automatic transmission 14 is provided with a first transmission 30 performing a switch between a high speed stage and a low speed stage, and a second transmission 32 capable of switching of a backward gear stage and four forward stages. The first transmission 30 is provided with an HL planetary gear apparatus 34, a clutch C0, a one way clutch F0 and a brake B0. The HL planetary gear apparatus 34 is constituted by a sun gear S0, a ring gear R0, a carrier K0 and a planetary gear P0. The planetary gear P0 is rotatably supported to the carrier K0 and engaged with the sun gear S0 and the ring gear R0. The clutch C0 and the one way clutch F0 are provided between the sun gear S0 and the carrier K0. The brake B0 is provided between the sun gear S0 and a housing 41.

The second transmission 32 is provided with a first planetary gear apparatus 36, a second planetary gear apparatus 38 and a third planetary gear apparatus 40. The first planetary gear apparatus 36 is constituted by a sun gear S1, a ring gear R1, a carrier K1 and a planetary gear P1. The planetary gear P1 is rotatably supported to the carrier K1 and engaged with the sun gear S1 and the ring gear R1. The second planetary gear apparatus 38 is constituted by a sun gear S2, a ring gear R2, a carrier K2 and a planetary gear P2. The planetary gear P2 is rotatably supported to the carrier K2 and engaged with the sun gear S2 and the ring gear R2. The third planetary gear apparatus 40 is constituted by a sun gear S3, a ring gear R3, a carrier K3 and a planetary gear P3. The planetary gear P3 is rotatably supported to the carrier K3 and engaged with the sun gear S3 and the ring gear R3.

The sun gear S1 and the sun gear S2 are integrally connected to each other, the ring gear R1, the carrier K2 and the carrier K3 are integrally connected, and the carrier K3 is connected to an output shaft 42. Further, the ring gear R2 is integrally connected to the sun gear S3. Further, a clutch C1 is provided between a side including the ring gear R2 and the sun gear S3 and a side including a intermediate shaft 44. A clutch C2 is provided between a side including the sun gear S1 and the sun gear S2 and a side including the intermediate shaft 44. Further, band type brake B1 for stopping a rotation of the sun gear S1 and the sun gear S2 is provided in the housing 41. Further, a one-way clutch F1 and a brake B2 are in series provided between a side including the sun gear S1 and the sun gear S2 and a side including the housing 41. This one-way clutch F1 is structured such as to be engaged at a time when the sun gear S1 and the sun gear S2 are going to inversely rotate in an opposite direction to the input shaft 20.

A brake B3 is provided between the carrier K1 and the housing 41. A brake B4 and a one-way clutch F2 are in parallel provided between the ring gear R3 and the housing 41. This one-way clutch F2 is structured such as to be engaged at a time when the ring gear R3 rotates inversely against a rotation applied when the vehicle moves forward.

Figure 3:
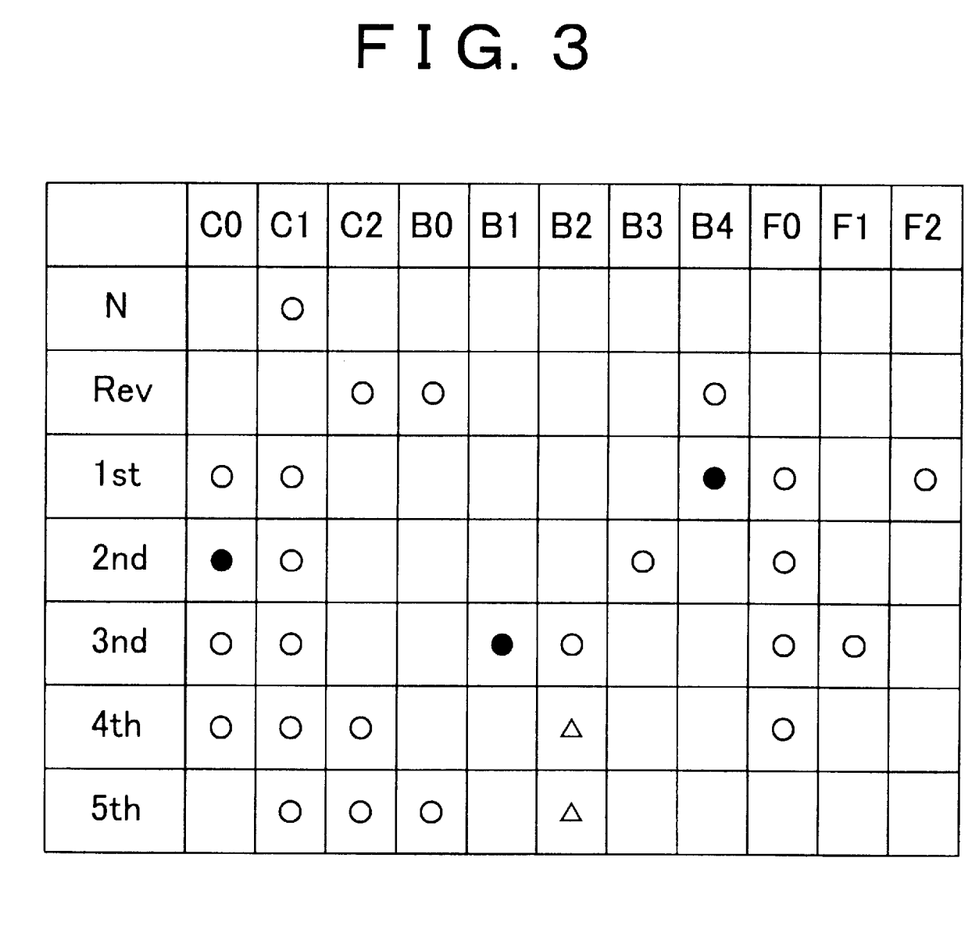
FIG. 3 is a table describing a relation between a combination of operating state of friction device of the automatic transmission shown in FIG. 1 and gear stages obtained thereby.

The automatic transmission 14 is switched to any one backward stage and five forward stages having sequentially different gear ratios, as shown by an operation table shown in FIG. 3. In FIG. 3, outline circle symbols (○) denote engagement states of the clutches C0 to C2, the brakes B0 to B4 and the one-way clutches F0 to F2, and a blank column denotes a released state. Further, black circle symbols (●) denote engagement states of the clutches C0 to C2, the brakes B0 to B4 and the one-way clutches F0 to F2 during generating an engine brake. The B2 is engaged, but does not receive torque transfer as indicated by triangle symbols (△) shown in FIG. 3. For example, if a shift lever 72 (refer to FIG. 1) is in a "D" range and a downshift operation is executed prior to entering a curved road during traveling, for example, at a fifth speed gear stage, the clutch C0 is engaged and the brake B0 is released. Accordingly, a downshift to the fourth speed from the fifth speed (a 5-to-4 downshift) is executed. Further, when the clutch C2 is released, a downshift to the third speed from the fourth speed (a 4-to-3 downshift) is executed. On the contrary, in the case of upshifting from a third speed gear stage, the clutch C2 is engaged, whereby an upshift to the fourth speed from the third speed (a 3-to-4 upshift) is executed. Further, when the clutch C0 is released and the brake B0 is engaged, an upshift to the fifth speed from the fourth speed (a 4-to-5 upshift) is executed.

FIG. 1 also shows a control unit provided in the vehicle. The structure is made such that an accelerator opening degree θA (%) corresponding to an operating amount of an accelerator pedal 50 is detected by an accelerator sensor 51. The accelerator pedal 50 is pedaled in correspondence to a required output by a driver, and corresponds to an acceleration operating member. A throttle valve 56 basically set at an opening angle (an opening degree) θTH (%) corresponding to the accelerator opening degree θA by a throttle actuator 54 is provided in an intake pipe 52 of the engine 10. There are provided an engine speed sensor 58, a throttle sensor with an idle switch (not shown), a vehicle speed sensor 66, a brake switch 70, an operating position sensor 74, an input shaft rotation sensor 73 and the like in this vehicle.

The engine speed sensor 58 detects a rotational speed NE (r.p.m.) of the engine 10. The throttle sensor with idle switch detects a fully closed state of the throttle valve 56 and the opening degree θTH thereof. The vehicle speed sensor 66 detects a rotational speed NOUT (r.p.m.) of the output shaft 42, that is, a vehicle speed V. The brake switch 70 detects an operation of a brake pedal 68. The operating position sensor 74 detects an operating position PSH of a shift lever 72. The input shaft rotation sensor 73 detects a rotational speed NIN of the input shaft 20, that is, a rotational speed NC0 of the clutch C0 (=a turbine rotational speed NT). Further, the structure is made such that signals representing the engine speed NE, the accelerator opening degree θA, the throttle valve opening degree θTH, the vehicle speed V, the brake operation state BK, the operating position PSH of the shift lever 72, the input shaft rotational speed NC0 and a hydraulic oil temperature TOIL are supplied from the sensors to an engine electronic control unit 76 or a shift electronic control unit 78. The shift lever 72 mentioned above is structured such as to be operated to a P position (a parking range), and an R position (a reverse range), an N position (a neutral range), a D position (a drive range), a fourth speed position (a fourth range), a third speed position (a third range), a second speed position (a second range), an L position (a low range).

The engine electronic control unit 76 and the shift electronic control unit 78 shown in FIG. 1 are connected so as to be communicated with each other, and a signal necessary for one is suitably transmitted from another. The engine electronic control unit 76 and the shift electronic control unit 78 are constituted by a so-called microcomputer provided with CPU, RAM, ROM and an input and output interface. The CPU processes the input signals based on a program previously stored in the ROM while utilizing a temporary storage function of the RAM, and executes various kinds of controls.

For example, the engine electronic control unit 76 controls a fuel injection valve 79 for controlling a fuel injection amount, controls an igniter 80 for controlling an ignition timing, and controls the throttle valve 56 by the throttle actuator 54 for traction control. Further, the engine electronic control unit 76 drives the throttle actuator 54 based on an actual accelerator pedal operation amount Acc from a relation (not shown), in the control of the throttle valve 56. The engine electronic control unit 76 basically increases the throttle valve opening degree θTH in accordance with an increase of the accelerator pedal operation amount Acc. Further, the engine electronic control unit 76 executes a torque reduction control during shifting for temporarily reducing the output of the engine 10 within a shift period of the automatic transmission 14 in order to relieve a shift shock.

Figure 4:
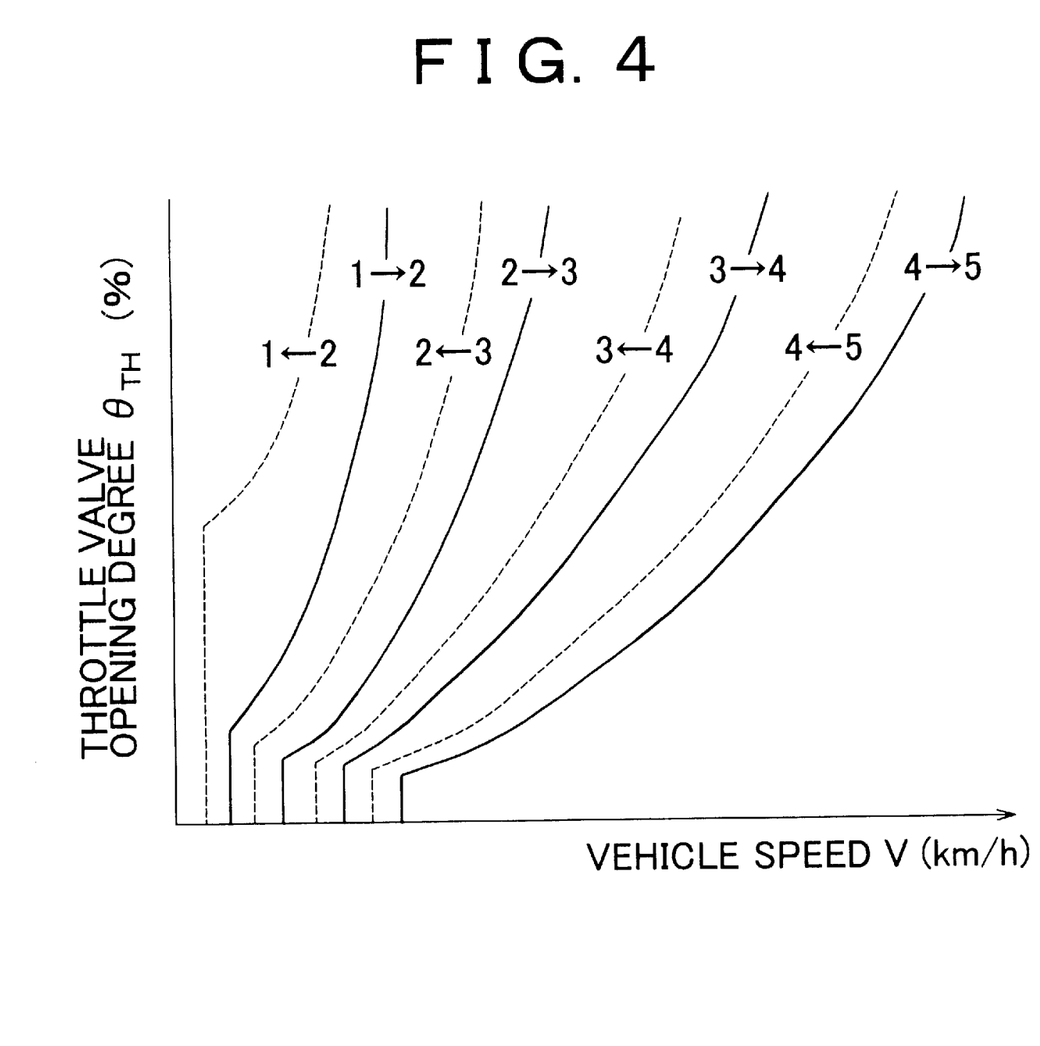
FIG. 4 is a graph showing a previously stored shift diagram used in an automatic shift control, in a vehicle shown in FIG. 1.

Further, the shift electronic control unit 78 determines a gear stage of the automatic transmission 14 based on the accelerator opening degree θA (that is, the throttle valve opening degree θTH) and the vehicle speed V corresponding to an actual engine load, for example, in accordance with a previously stored shift diagram shown in FIG. 4. Further, the shift electronic control unit 78 executes an automatic shift control for controlling an electromagnetic valve of a hydraulic control circuit provided in the automatic transmission 14 so as to establish the determined gear stage. In FIG. 4, a solid line shows an upshift line and a broken line shows a downshift line. Further, as shown in FIG. 1, there are provided an antenna 82 receiving a radio wave from a satellite, a navigation apparatus 84, an ABS and VSC electronic control unit 86 in this vehicle. The shift electromagnetic control unit 78 mentioned above executes a cooperative shift control for executing the shift based on a signal from the navigation apparatus 84, a turning signal from the ABS and VSC electronic control unit 86 and the like, in addition to the automatic shift control.

The navigation apparatus 84 receives a radio wave (a GPS (global positioning system) signal) from the satellite via the antenna 82 by utilizing a GPS. The navigation apparatus 84 sequentially displays a current position of the vehicle on a road within a previously stored map while sequentially calculating the current position on the basis of the GPS signal. Further, the navigation apparatus 84 judges a radius of curvature R and a turning angle θ of a corner on a road in the periphery of the vehicle, for example, a road in a traveling direction of the vehicle, and outputs a control signal corresponding to a road shape. The navigation apparatus 84, for example, stores a plurality of node points representing the road, and calculates the radius of curvature R of the corner from one node and nodes existing before and after that node, that is, a total of three nodes. Further, the navigation apparatus 84 determines a proper vehicle speed at which the vehicle can stably travel along the corner, from the radius of curvature R. Further, the navigation apparatus 84 judges the turning angle θ of the node from a tangent line of a curved line obtained by smoothly connecting the respective nodes. The navigation apparatus 84 determines, for example, a gentle corner (20 degrees≦θ<40 degrees), a medium corner (40 degrees≦θ<95 degrees) and a hairpin corner (95 degrees≦θ) in correspondence to a magnitude of the turning angle θ. A corner area is defined as an area from a predetermined distance in front of the node to the node, or to a position set based on the node. In this case, the position predetermined distance in front of the node or the position set based on the node may be suitably changed based on the kind of the respective corners.

The cooperative shift control mentioned above determines a recommended gear ratio of the automatic transmission based on the information associated with the road around the vehicle and in front of the vehicle and the traveling state of the vehicle. Further, the cooperative shift control compares the recommended gear ratio with a target gear ratio determined based on a required drive force of the driver and the vehicle speed so as to control shift of the automatic transmission 14 at an optimum gear ratio. That is, the cooperative shift control corresponds to a shift control for a curve which is executed by being given priority over to the automatic shift control setting the gear stage determined in accordance with the shift diagram in FIG. 4, for the purpose of increasing an engine brake force so as to enter the curve at a proper speed and stably travel on the curved road. Further, the cooperative shift control executes the upshift inhibition or the downshift according to the release of the accelerator pedal 50 or the reduction of the accelerator opening degree θA and the operation of the brake pedal 68 prior to entering the curve area. Further, the cooperative shift control finishes the cooperative shift control when the vehicle passes an exit of the curve area, that is, a specific node point or a position determined based thereon so as to resume to the normal automatic shift control using the shift diagram in FIG. 4. The exit of the curve area mentioned above corresponds to the specific node point or the position determined based thereon.

For example, in the cooperative shift control mentioned above, during deceleration, the radius of curvature R in the curve area positioned in front of the vehicle is calculated, and a proper vehicle speed is calculated based on the radius of curvature R in accordance with a relation previously calculated for safety driving. The relation is determined so that the proper vehicle speed becomes low as the radius of curvature R becomes smaller. Next, a deceleration curve (area) is determined based on the proper vehicle speed and the distance to the curve area (the specific node point). The deceleration curve represents a vehicle speed capable of reducing a speed to the proper vehicle speed without an uncomfortable feeling at each point in front of the specific node point on the curve for the purpose of traveling through the specific node point on the curve at the proper vehicle speed. Further, a recommended gear stage (a recommended gear ratio) is determined by comparing the current vehicle speed with the deceleration curve and determining what position the current vehicle speed exists with respect to the deceleration curve. In order to approximate the current vehicle speed to the recommended gear stage, it is judged whether the current gear stage is maintained (the upshift inhibition) or the downshift should be executed. Further, the upshift inhibition or the downshift operation is commanded at a time when the accelerator release operation or the brake operation is executed at the predetermined distance before entering the curve area. Further, the transmission is controlled based on the command, and the gear stage commanded is maintained during the curve area traveling.

Figure 5:
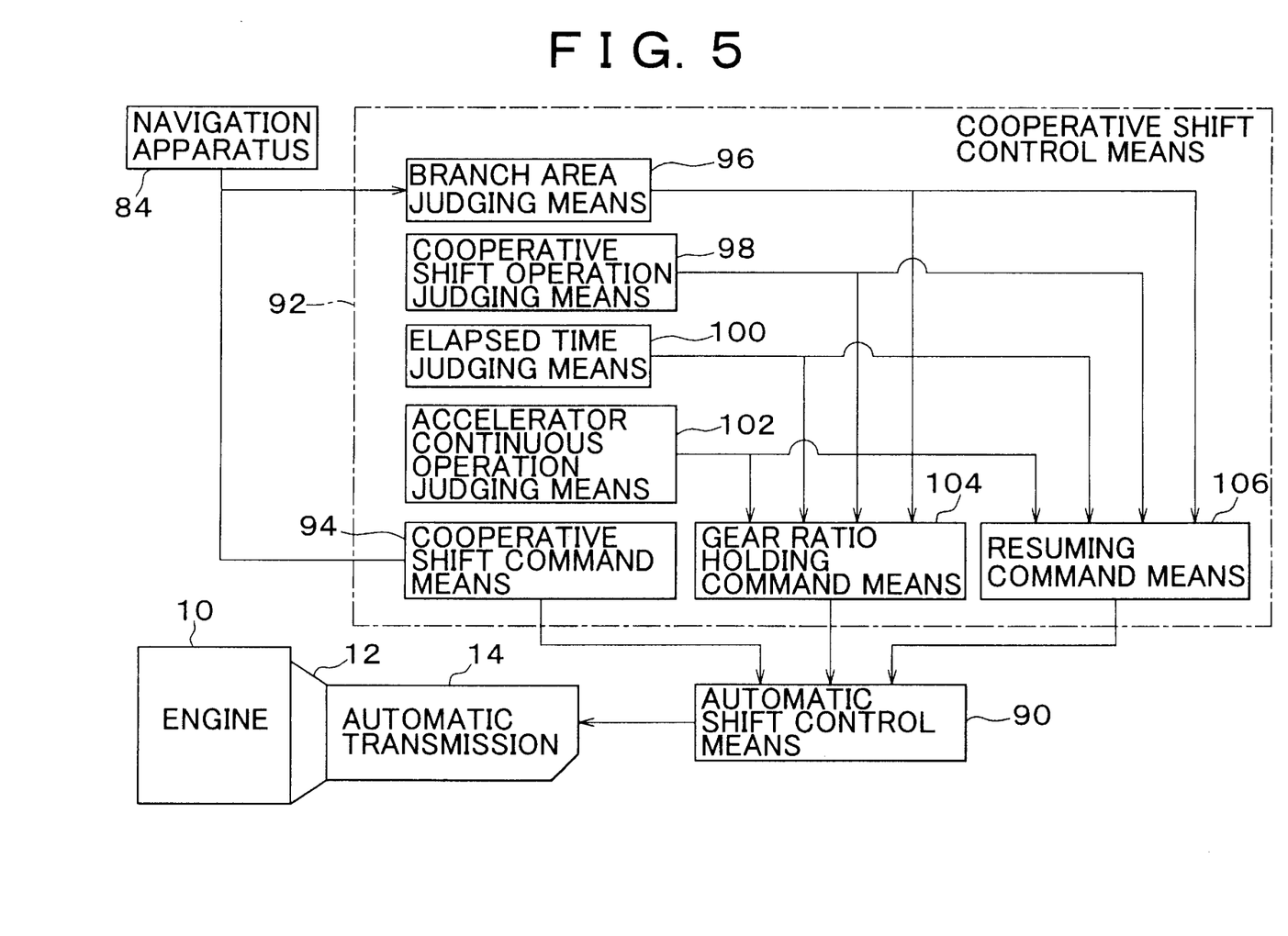
FIG. 5 is a function block diagram describing a main portion of a navigation cooperative shift control function in an electronic control unit for controlling a shift shown in FIG. 1.

FIG. 5 is a function block diagram describing a main portion of a control function of the shift electronic control unit 78. In FIG. 5, an automatic shift control means 90 determines the gear stage of the automatic transmission 14 based on the accelerator opening degree θA (that is, the throttle opening degree θTH) corresponding to the actual load of the engine 10 and the vehicle speed V, for example, in accordance with the well-known previously stored shift diagram shown in FIG. 4. Further, the automatic shift control means 90 controls an electromagnetic valve of a hydraulic control circuit (not shown) provided in the automatic transmission 14 so as to establish the determined gear stage.

A cooperative shift control means 92 inhibits an upshift or executes a downshift by giving it priority over the automatic shift control for setting the gear stage determined in accordance with the shift diagram in FIG. 4, provided that the accelerator pedal 50 is released or the accelerator opening degree θA is reduced and the brake pedal 68 is operated, when it is judged that the vehicle has entered the curve area based on the signal from the navigation apparatus 84. In accordance with the control mentioned above, for example, during coasting, it is possible to increase the engine brake force so as to enter the curve at a proper vehicle speed and stably travel on the curved road. Further, upshifting is executed at a time when a linear travel is established after passing the exit of the curve area, that is, the specified node point or the position determined based thereon. That is, the cooperative shift control is finished so as to resume to the normal automatic shift control using the shift diagram in FIG. 4. Further, the cooperative shift control means 92 temporarily maintains the gear ratio achieved by the downshift at a time when the vehicle comes near the branch point of the road even when the vehicle is not under route guidance. The cooperative shift control means 92 further permits shifting of the automatic transmission 14 based on the fact that an elapsed time after the vehicle passed through a predetermined place that is predetermined based on the branch point of the road, for example, an entrance of a branch area exceeds a predetermined judgement reference value. Otherwise, the cooperative shift control means 92 permits shifting of the automatic transmission 14 based on the fact that the accelerator pedal operation is continuously executed for a predetermined time or longer after the vehicle enters the branch area previously defined based on the branch point of the road.

Figure 6:
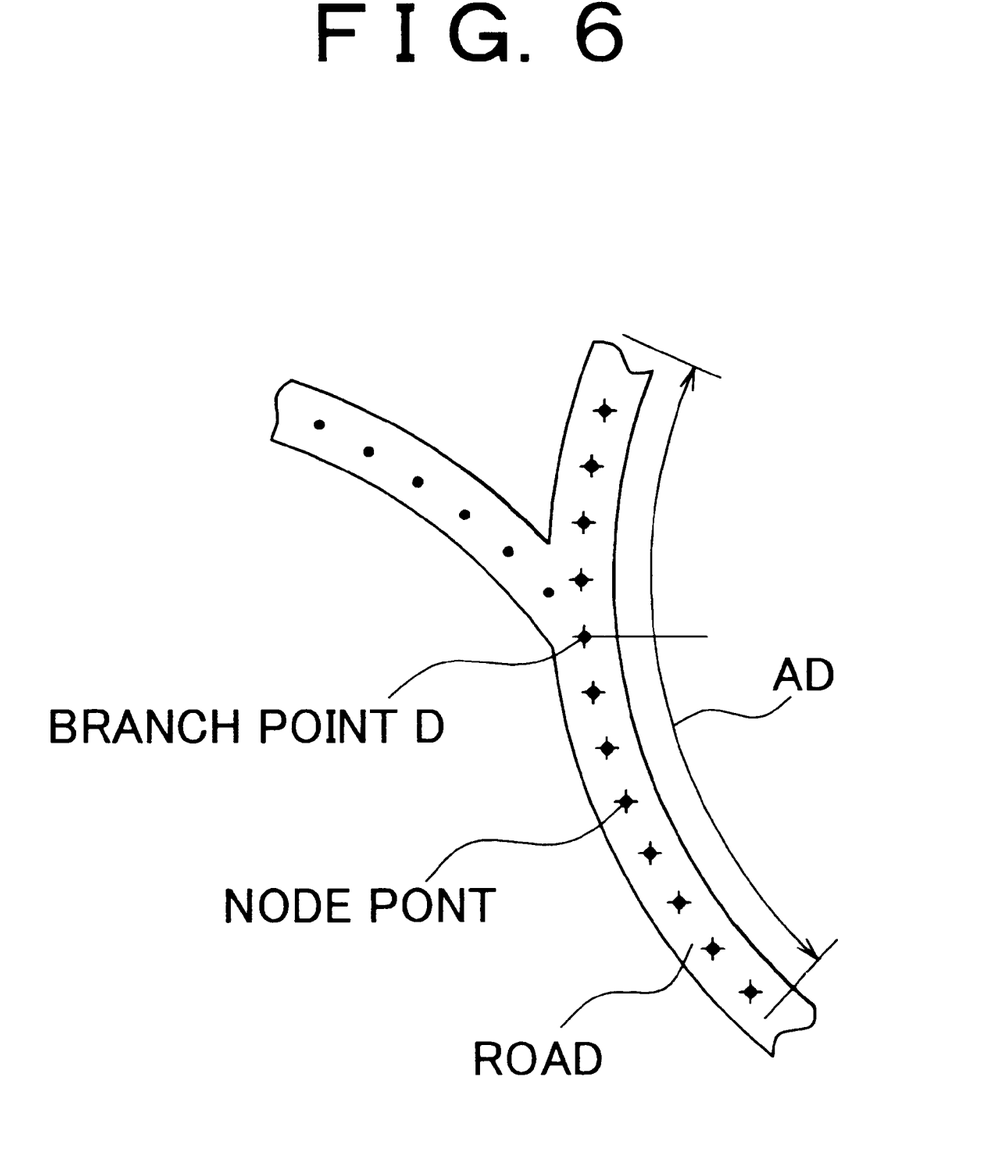
FIG. 6 is a view describing a branch point D of a road detected by branch area judging means in FIG. 5 and a branch area set on the basis thereof.

As shown in FIG. 6, the navigation apparatus 84 stores the road based on a sequence of a plurality of node points corresponding to center points in a width direction. The navigation apparatus 84 recognizes the node points corresponding to a point at which the curve passing through the node point is branched, as a branch point D. A branch area AD is an area having a predetermined length including the branch point D and is set, for example, as an area from a position ninety meter before the branch point D to a point forty meter after the branch point D.

As shown in FIG. 5, the cooperative shift control means 92 is provided with cooperative shift command means 94. The cooperative shift command means 94 stabilizes a curve traveling by increasing an engine brake force during traveling on the curve so as to enter the curve at a proper vehicle speed. Accordingly, the cooperative shift command means 94 judges the upshift inhibition or the downshift in accordance with the signal from the navigation apparatus 84, the actual vehicle speed V, and the like. Further, the cooperative shift command means 94 commands the upshift inhibition or the downshift giving it priority over the automatic shift control for establishing the gear stage determined in accordance with the shift diagram in FIG. 4, provided that the accelerator pedal 50 is released, or the accelerator opening degree θA is reduced and the brake pedal 68 is operated, when it is judged that the vehicle is a predetermined distance before entering the curve area.

Further, the cooperative shift control means 92 is provided with branch area judging means 96, cooperative shift operation judging means 98, elapsed time judging means 100, accelerator continuous operation judging means 102, gear ratio holding command means 104 and resume command means 106.

The branch area judging means 96 judges whether the traveling vehicle exists within the branch area AD. The cooperative shift operation judging means 98 judges whether a downshifted state for the cooperative shift control is maintained by the cooperative shift command means 94 or the upshift is inhibited by the cooperative shift command means 94. The elapsed time judging means 100 judges whether an elapsed time tEL after the vehicle enters the branch area AD has become equal to or longer than a predetermined elapsed time judging value T1. The accelerator continuous operation judging means 102 judges whether an accelerator pedal 50 is continuously pedaled for a predetermined operating time judging value T2 or longer within the branch area AD in order to judge an intention of a driver to accelerate (an idle switch is turned off). The gear ratio holding command means 104 temporarily inhibits shifting of the automatic transmission 14 and commands so as to keep the gear ratio or the gear stage, when all of the following conditions I, II, III and IV are satisfied. The condition I mentioned above corresponds to a condition judged by the branch area judging means 96 that the vehicle is within the branch area AD. The condition II mentioned above corresponds to a condition judged by the cooperative shift operation judging means 98 that the downshifted state for controlling the cooperative shift control is maintained or the upshift for controlling the cooperative shift control is inhibited. The condition III mentioned above corresponds to a condition judged by the elapsed time judging means 100 that the elapsed time tEL after the vehicle enters the branch area AD has not become equal to or longer than the elapsed time judging value T1. The condition IV mentioned above corresponds to a condition judged by the accelerator continuous operation judging means 102 that the accelerator pedal 50 has not been continuously operated for the operating time judging value T2 or longer. The resume command means 106 commands so as to resume the gear ratio or the gear stage for permitting shifting of the automatic transmission 14 and terminating the cooperative shift control, when all of the following conditions V, VI and VII are satisfied. The condition V mentioned above corresponds to a condition judged by the branch area judging means 96 that the vehicle is within the branch area AD. The condition VI mentioned above corresponds to a condition judged by the cooperative shift operation judging means 98 that the downshifted state for the cooperative shift control is maintained or the upshift is inhibited for the cooperative shift control. The condition VII mentioned above corresponds to a condition judged by the elapsed time judging means 100 that the elapsed time tEL after the vehicle enters the branch area AD is equal to or longer than the elapsed time judging value T1, or judged by the accelerator continuous operation judging means 102 that the accelerator pedal 50 is continuously operated for the operating time judging value T2 or longer.

The cooperative shift control means 92 temporarily inhibits shifting of the automatic transmission 14 within the branch area AD even when not under route guidance so as to hold the gear ratio or the gear stage, and permits shifting of the automatic transmission 14 when the vehicle passes the branch area AD so as to command the gear ratio or the gear stage to be resumed for the purpose of terminating the cooperative shift control.

The elapsed time judging value T1 mentioned above functions as a guard timer for preventing command maintaining the gear ratio from being continuing over a long time due to some reasons. Further, the operating time judging value T2 is set for the purpose of confirming the intention for acceleration based on the continuous operation of the accelerator pedal 50.

Figure 7:
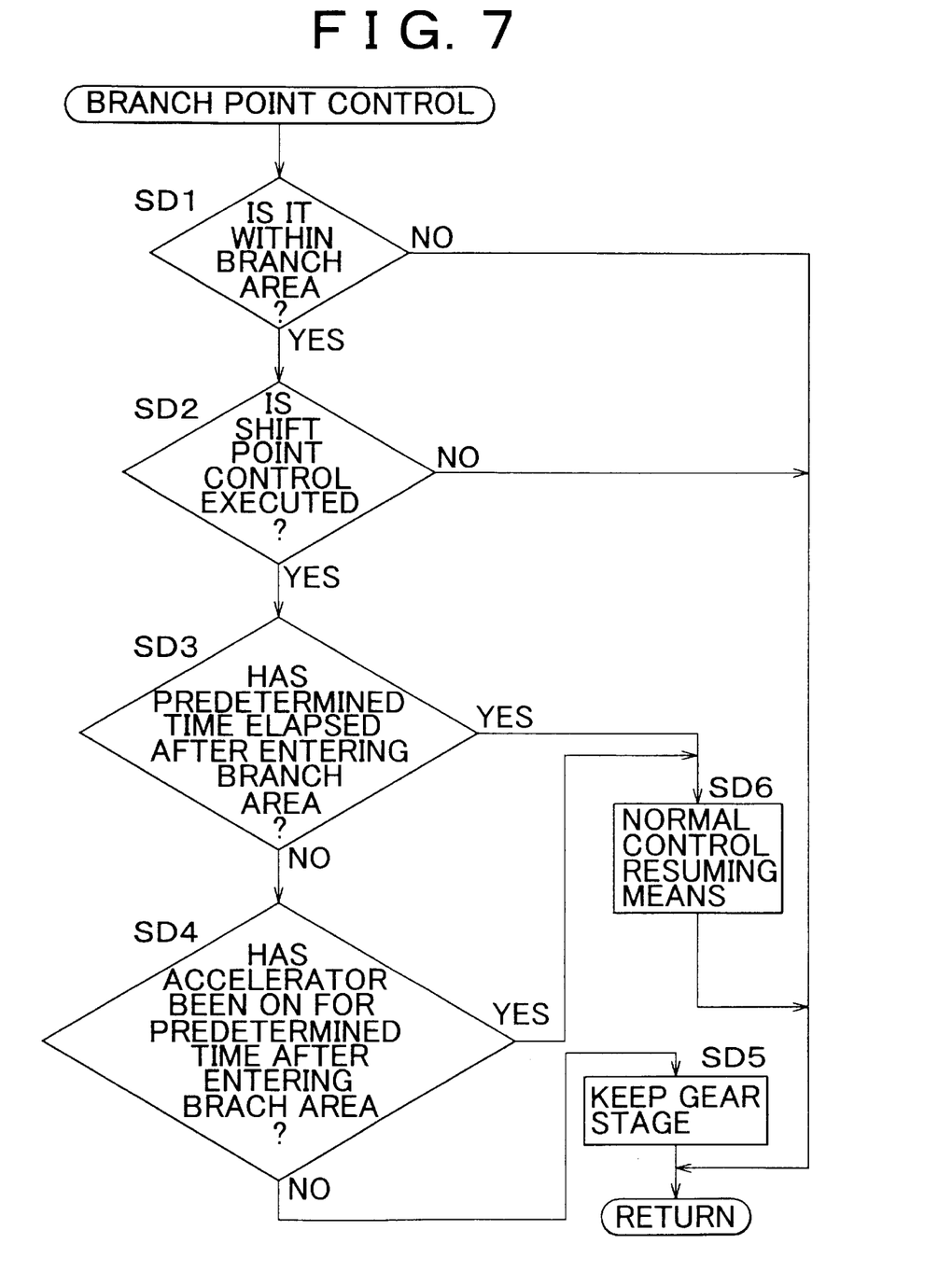
FIG. 7 is a flow chart describing a main portion of the cooperative shift control operation using a navigation apparatus in the electronic control unit for controlling the shift shown in FIG. 3.

FIG. 7 is a flow chart describing a main portion of the control operation of the shift electronic control unit 78 mentioned above. In FIG. 7, in step SD1 corresponding to the branch area judging means 96, it is judged whether the vehicle is within the branch area AD previously defined from the branch point D. If the judgement of SD1 is denied, the present routine is terminated. However, if the judgment of SD1 is affirmed, in SD2 corresponding to the cooperative shift operation judging means 98, it is judged whether the downshifted state executed by the cooperative shift command means 94 is maintained by the cooperative shift command means 94 or the upshift is inhibited by the cooperative shift command means 94, that is, the shift point control is executed. If the judgement of the SD2 is denied, the present routine is terminated. However, if the judgement of SD2 is affirmed, in SD3 corresponding to the elapsed time judging means 100, it is judged whether the elapsed time tEL after entering the branch area AD has become equal to or longer than the predetermined elapsed time judging value T1. If the judgement of SD3 is affirmed, in SD6 corresponding to the resume command means 106, the resumption of the gear ratio or the gear stage is commanded for the purpose of permitting shifting of the automatic transmission so as to terminate the cooperative shift control.

If the judgement of SD3 is denied, in SD4 corresponding to the accelerator continuous operation judging means 102, it is judged whether the accelerator pedal 50 is continuously operated for the operating time judging value T2 or longer. If the judgement of SD4 is denied, the SD6 mentioned above is executed. However, if the judgement of SD4 is affirmed, in SD5 corresponding to the gear ratio holding command means 104, shifting of the automatic transmission 14 is temporarily inhibited, and the holding of the gear ratio or the gear stage is commanded.

As mentioned above, in accordance with the present embodiment, in the vehicular automatic shift control unit for executing the cooperative shift control of the automatic transmission 14 based on the information associated with the road condition in front of the vehicle, when the vehicle approaches the branch point D of the road, the current gear ratio is maintained before and after the branch point. Accordingly, the vehicle can travel near the branch point D in the state of maintaining the gear stage or the gear ratio of the automatic transmission 14 in which the upshift is inhibited is executed during the cooperative shift control or in which the downshift is executed during the cooperative shift control. Therefore, the state where the upshift is inhibited in accordance with the cooperative shift control or the downshift is executed in accordance with the cooperative shift control is continuously kept during traveling on the curved road. Accordingly, even if the vehicle approaches the branch point during traveling on the curved road when the vehicle is not under route guidance, the state where the upshift is inhibited or the downshift is executed is continuously kept, and therefore upshifting is not executed, so that a drivability during traveling along the corner is not deteriorated.

Further, in accordance with the present embodiment, after passing through the branch point D, when the elapsed time tEL after the vehicle passes through the predetermined place that is predetermined based on the branch point D of the road, for example, the entrance of the branch area AD exceeds the predetermined reference value (the predetermined elapsed time judging value T1), shifting of the automatic transmission 14 is permitted. Accordingly, there is an advantage that the upshift is permitted after sufficiently passing the branch point D after the current gear ratio is maintained for the predetermined time corresponding to the reference value (the predetermined elapsed time judging value T1).

Further, in accordance with the present embodiment, when the operation of the accelerator pedal 50 is continuously executed for the predetermined time T2 or longer after the vehicle enters the branch area AD including the branch point D previously defined based on the branch point D of the road, shifting of the automatic transmission 14 is allowed. If the accelerator pedal operation continues for the predetermined time T2 or longer after entering the branch area AD, the driver's intention for acceleration is recognized. If the driver's intention for acceleration is recognized, shifting of the automatic transmission 14 is permitted. Accordingly, the current gear ratio is maintained until the intention for acceleration is recognized. Accordingly, there can be obtained an advantage that the upshift is preferably permitted after passing the branch point D or the branch area AD.

Further, in accordance with the present embodiment, since the information associated with the condition in the periphery of the vehicle or in front of the vehicle is supplied from the navigation apparatus 84 mounted on the vehicle, the upshift inhibition or the downshift in accordance with the cooperative shift control can be preferably executed during traveling on the mountain road. The navigation apparatus 84 may supply the an inclination of the road as the information associated with the condition in the periphery of the vehicle or in front of the vehicle.

The description has been given of one embodiment in accordance with the invention with reference to the accompanying drawings, however, the invention can be applied to the other embodiments.

For example, in the vehicle in accordance with the embodiment mentioned above, the corner ahead of the vehicle, the branch point D and the like are judged in accordance with the signal from the navigation apparatus 84 provided in the vehicle, however, the corner ahead of the vehicle and the like may be judged in accordance with signals from a road information transmitting apparatus provided in the road.

Further, in the embodiment mentioned above, the invention is applied to the control from the fifth speed to the third speed in the automatic transmission 14 with steps, however, it may be applied to a control of other gear stages. Further, for example, it is possible to apply the invention to a vehicle provided with a continuously variable transmission of a type wherein a drive belt is wound around a pair of variable pulleys having variable effective diameters. Even in the continuously variable transmission, the invention can be applied to the case where predetermined plural kinds of gear ratios are switched continuously or step by step.

Further, the engine electronic control unit 76 and the shift electronic control unit 78 connected to each other via the communication line are provided in the vehicle in accordance with the embodiment mentioned above, however, the control mentioned above may be executed by an arithmetic control unit which is commonly provided, or may be executed by an electronic control unit provided in the navigation apparatus 84.

Further, in FIGS. 5 to 7 mentioned above, the elapsed time judging means 100 (SD3) and the acceleration continuous operation judging means 102 (SD4) may not always be provided.

The description in detail has been given above of the embodiment in accordance with the invention with reference to the accompanying drawings, however, this is only one embodiment, and the invention can be variously modified based on the knowledge of those skilled in the art and can be put into practice in improved modes.

What is claimed is:

1. A vehicular automatic shift control unit that executes an automatic shift control for executing a shift control of an automatic transmission in a vehicle so as to establish a target gear ratio determined based on a driving force required by a driver and a vehicle speed, and a cooperative shift control for executing at least one of a downshift and an upshift prohibition of the automatic transmission based on information associated with at least one of a road condition around the vehicle and a road condition in front of the vehicle such that the cooperative shift control is given priority over the automatic shift control, comprising:

judging means for judging whether the vehicle exists in a predetermined area including a branch point of the road during execution of the cooperative shift control by judging that the predetermined area has a branch point; and gear ratio maintaining means for maintaining a gear ratio of the automatic transmission if a judgement is made that the vehicle exists in the predetermined area.

2. The vehicular automatic shift control unit according to claim 1, wherein the judging means judges whether an elapsed time after the vehicle enters the predetermined area is greater than a predetermined reference value, and the gear ratio maintaining means permits shifting of the automatic transmission based on the automatic shift control if the elapsed time is greater than the reference value.

3. The vehicular automatic shift control unit according to claim 1, wherein the judging means judges whether an accelerator pedal operation is continuously executed for a predetermined time or longer after the vehicle enters the predetermined area, and the gear ratio maintaining means permits shifting of the automatic transmission based on the automatic shift control if it is judged that the accelerator pedal operation is continuously executed for the predetermined time or longer.

4. The vehicular automatic shift control unit according to claim 1, further comprising a navigation apparatus supplying the information associated with at least one of the road condition around the vehicle and the road condition in front of the vehicle.

5. The vehicular automatic shift control unit according to claim 1, further comprising:

recommended gear ratio determining means that determines a recommended gear ratio of the automatic transmission based on the information associated with at least one of the road condition around the vehicle and the road condition in front of the vehicle and a traveling state of the vehicle, wherein the cooperative shift control is executed based on the recommended gear ratio.

6. The vehicular automatic shift control unit according to claim 5, wherein the traveling state of the vehicle includes a reduction of acceleration requirement and braking requirement by a driver.

7. A vehicular automatic shift control method for executing an automatic shift control for executing a shift control of an automatic transmission in a vehicle so as to establish a target gear ratio determined based on a driving force required by a driver and a vehicle speed, and a cooperative shift control for executing at least one of a downshift and an upshift prohibition of the automatic transmission based on information associated with at least one of a road condition around the vehicle and a road condition in front of the vehicle such that the cooperative shift control is given priority over the automatic shift control, comprising:

a step of judging whether the vehicle exists in a predetermined area including a branch point of the road during execution of the cooperative shift control by judging that the predetermined area has a branch point; and a step of maintaining a gear ratio of the automatic transmission if a judgement is made that the vehicle exists in the predetermined area.

8. The vehicular automatic shift control method according to claim 7, further comprising:

a step of judging whether an elapsed time after the vehicle enters the predetermined area is greater than a predetermined reference value if it is judged that the vehicle exists in the predetermined area; and a step of permitting shifting of the automatic transmission based on the automatic shift control if the elapsed time is greater than the reference value.

9. The vehicular automatic shift control method according to claim 7, further comprising:

a step of judging whether an accelerator pedal operation is continuously executed for a predetermined time or longer after the vehicle enters the predetermined area if it is judged that the vehicle exists in the predetermined area; and a step of permitting shifting of the automatic transmission based on the automatic shift control if it is judged that the accelerator pedal operation is continuously executed for the predetermined time or longer.

10. The vehicular automatic shift control method according to claim 7, wherein the vehicle is provided with a navigation apparatus that supplies the information associated with at least one of the road condition around the vehicle and the road condition in front of the vehicle, and the cooperative shift control is executed on the basis of the information associated with at least one of the road condition around the vehicle and the road condition in front of the vehicle supplied from the navigation apparatus.

11. The vehicular automatic shift control method according to claim 7, wherein the cooperative shift control is executed on the basis of a recommended gear ratio determined based on the information associated with at least one of the road condition around the vehicle and the road condition in front of the vehicle and a traveling state of the vehicle.

12. The vehicular automatic shift control method according to claim 11, wherein the traveling state of the vehicle is a reduction of acceleration requirement and braking requirement by a driver.

13. A vehicular automatic shift apparatus that executes an automatic shift control for executing a shift control of an automatic transmission in a vehicle so as to establish a target gear ratio determined based on a driving force required by a driver and a vehicle speed, and a cooperative shift control for executing at least one of a downshift and an upshift prohibition of the automatic transmission based on information associated with at least one of a road condition around the vehicle and a road condition in front of the vehicle such that the cooperative shift control is given priority over the automatic shift control, comprising:
a controller that judges whether the vehicle exists in a predetermined area including a branch point of the road during execution of the cooperative shift control by judging that the predetermined area has a branch point, and maintains a gear ratio of the automatic transmission if a judgement is made that the vehicle exists in the predetermined area.

14. The vehicular automatic shift control unit according to claim 13, wherein the controller judges whether an elapsed time after the vehicle enters the predetermined area is greater than a predetermined reference value, and permits shifting of the automatic transmission based on the automatic shift control if the elapsed time is greater than the reference value.

15. The vehicular automatic shift control unit according to claim 13, wherein the controller judges whether an accelerator pedal operation is continuously executed for a predetermined time or longer after the vehicle enters the predetermined area, and permits shifting of the automatic transmission based on the automatic shift control if it is judged that the accelerator pedal operation is continuously executed for the predetermined time or longer.

16. The vehicular automatic shift control unit according to claim 13, further comprising a navigation apparatus supplying the information associated with at least one of the road condition around the vehicle and the road condition in front of the vehicle.

17. The vehicular automatic shift control unit according to claim 13, wherein the cooperative shift control is executed on the basis of a recommended gear ratio determined based on the information associated with at least one of the road condition around the vehicle and the road condition in front of the vehicle and a traveling state of the vehicle.

18. The vehicular automatic shift control unit according to claim 17, wherein the traveling state of the vehicle includes a reduction of acceleration requirement and braking requirement by a driver.

* * * * *